United States Patent
Yehezkely et al.

(10) Patent No.: US 11,889,420 B2
(45) Date of Patent: Jan. 30, 2024

(54) TECHNIQUES FOR WAKEUP IN A LOW-POWER WIRELESS DEVICE

(71) Applicant: Wiliot, Ltd., Caesarea (IL)

(72) Inventors: Alon Yehezkely, Haifa (IL); Sagi Kupferman, Herzliya (IL); David Lipshitz, Raanana (IL)

(73) Assignee: WILIOT, LTD., Caesarea (IL)

( * ) Notice: Subject to any disclaimer, the term of this patent is extended or adjusted under 35 U.S.C. 154(b) by 0 days.

(21) Appl. No.: 17/501,162

(22) Filed: Oct. 14, 2021

(65) Prior Publication Data

US 2023/0119150 A1     Apr. 20, 2023

(51) Int. Cl.
*H04W 52/02* (2009.01)
*H04W 72/0453* (2023.01)
*H04W 4/80* (2018.01)

(52) U.S. Cl.
CPC ......... *H04W 52/0229* (2013.01); *H04W 4/80* (2018.02); *H04W 72/0453* (2013.01)

(58) Field of Classification Search
CPC .............. H04W 52/0229; H04W 4/80; H04W 72/0453
USPC ....................................................... 455/41.1
See application file for complete search history.

(56) References Cited

U.S. PATENT DOCUMENTS

| 4,856,082 | A  | 8/1989  | Kasa |
| 10,804,946 | B2 | 10/2020 | Wang et al. |
| 2004/0085190 | A1 | 5/2004 | Tuttle et al. |
| 2004/0119517 | A1 | 6/2004 | Pauletti et al. |
| 2013/0281139 | A1 | 10/2013 | Wilhelmsson et al. |
| 2014/0062672 | A1 | 3/2014 | Gudan et al. |
| 2016/0105162 | A1 | 4/2016 | Zangi et al. |
| 2019/0371342 | A1 | 12/2019 | Tukka et al. |
| 2021/0104917 | A1 | 4/2021 | Kim et al. |
| 2021/0219335 | A1 | 7/2021 | Zhang et al. |

FOREIGN PATENT DOCUMENTS

WO    2021121625 A1    6/2021

OTHER PUBLICATIONS

International Search Report and Written Opinion of International Searching Authority for PCT/IB2021/059463, ISA/IL, Jerusalem, Israel dated Feb. 7, 2022.
Gerd Ulrich Gamm; Matthias Sippel; Milos Kostic; Leonhard M. Reindl. "Low power wake-up receiver for wireless sensor nodes". Dec. 7-10, 2010. https://ieeexplore.ieee.org/document/5706778.
Haowei Jiang , Po-Han Peter Wang , Li Gao, Corentin Pochet, Gabriel M. Rebeiz, Drew A. Hall , Patrick P. Mercier. "A 22.3-nW, 4.55 cm2 Temperature-Robust Wake-Up Receiver Achieving a Sensitivity of −69.5 dBm at 9 GHz". Jun. 6, 2020 https://bioee.ucsd.edu/papers/A%2022.3-nW,%204.55%20cm2%20Temperature-Robust%20Wake-Up%20Receiver%20Achieving%20a%20Sensitivity%20of%20%e2%88%9269.5%20dBm%20at%209%20GHz%20-%20Mercier%20(JSSC,%202020).pdf.
Mohamed Zgaren; Mohamad Sawan. "Low-Power RFED Wake-Up Receiver Design for Low-Cost Wireless Sensor Network Applications". Dec. 6, 2015 https://ieeexplore.ieee.org/document/7440317.

(Continued)

*Primary Examiner* — Eugene Yun
(74) *Attorney, Agent, or Firm* — M&B IP Analysts, LLC.

(57) ABSTRACT

A system and method for waking up a low-power wireless device is provided. The method includes: initializing a wakeup sensitivity to minimum of a wakeup circuit of the wireless device; searching for at least one beacon by the wakeup circuit; increasing the wakeup sensitivity of the wakeup circuit when the at least one beacon is not found; and setting the wakeup sensitivity to a value at which the least one beacon is received.

10 Claims, 7 Drawing Sheets

(56) References Cited

OTHER PUBLICATIONS

David Galante-Sempere, Dailos Ramos-Valido, Sunil Lalchand Khemchandani and Javier del Pino. "Low-Power RFED Wake-Up Receiver Design for Low-Cost Wireless Sensor Network Applications". Nov. 10, 2020. https://www.mdpi.com/1424-8220/20/22/6406.

Martin Tomasz Senior Scientist Touchstone Semiconductor, Inc. "A Unique, Ultra-low Power Analog IC Enables RF Wakeup Applications". Retrieved from https://www.digikey.com/en/content-search?f=286498601&f=937649491 on Oct. 12, 2021.

TECHNIQUES FOR WAKEUP IN A LOW-POWER WIRELESS DEVICE

TECHNICAL FIELD

The present disclosure generally relates to wake-up circuits of low power wireless devices.

BACKGROUND

The Internet of things (IoT) is the inter-networking of physical devices, vehicles, buildings, and other items embedded with electronics, software, sensors, actuators, and network connectivity that enable these objects to collect and exchange data. IoT is expected to offer advanced connectivity of devices, systems, and services that goes beyond machine-to-machine (M2M) communications and covers a variety of protocols, domains, and applications.

IoT can be encapsulated in a wide variety of devices, such as heart monitoring implants; biochip transponders on farm animals; automobiles with built-in sensors; automation of lighting, heating, ventilation, air conditioning (HVAC) systems; and appliances such as washer/dryers, robotic vacuums, air purifiers, ovens or refrigerators/freezers that use wireless communication protocol that supports IoT devices for remote monitoring. Typically, IoT devices encapsulate wireless sensors or a network of such sensors.

Most IoT devices are wireless devices that collect data and transmit such data to a central controller. There are a few requirements to be met to allow widespread deployment of IoT devices. Such requirements include reliable communication links, low energy consumption, low costs, and small sizes.

To this aim, IoT devices and wireless sensors are designed to support low power communication protocols, such as Bluetooth low energy (BLE), LoRa, and the like. However, IoT devices utilizing such protocols require a battery, e.g., a coin battery. The reliance on a power source (e.g., a battery) is a limiting factor for electronic devices, due to, for example, cost, size, lack of durability to environmental effects, and frequent replacements. An alternative to using batteries, a self-sufficient or self-sustainable power supply that may harvest energy from sources such as light, heat, activity, piezoelectric, and electromagnetic energy can be incorporated. Electromagnetic energy that includes radio frequency (RF) is promising in its relatively unrestricted spatial freedom and abundance.

The BLE standard defines 40 communication channels from 2.4000 GHz to 2.4835 GHz within the industrial, scientific, and medical (ISM) bands. Out of these 40 communication channels, 37 channels are used for communication data and the last three channels 37, 38, 39 are used as advertising channels to set up connections and send broadcast data. The BLE standard defines a frequency hopping spread spectrum technique in which a radio hops between channels on each connection event. A broadcaster device may advertise on any one of the 3 advertisement channels. The modulation scheme defined for the BLE standard is a Gaussian frequency shift keying (GFSK) modulation.

In order to reduce energy consumption and increase battery life in wireless devices, methods of duty cycling with active and sleep states have been explored. For RF devices, the majority of the device's energy is consumed by the transceiver at the active state, when the system actively communicates and processes such communication signals. It has been identified that the device in its active state consumes up to 3 to 4 orders of magnitude of energy compared to its sleep state. In this regard, duty cycle methods to effectively utilize sleep states of the system is desired.

However, random and frequent activation may have an adverse effect on the system, draining the stored energy of the wireless device. In particular, the 2.4 GHz ISM radio frequency band is densely populated with signals that may falsely activate (wake-up) the system. Identifying target signals (e.g., a BLE Advertising event) and selectively activating the system within the abundance of signals in similar range still remains a challenge.

It would therefore be advantageous to provide a solution that can effectively reduce energy consumption by tacking some challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the terms "some embodiments" or "certain embodiments" may be used herein to refer to a single embodiment or multiple embodiments of the disclosure.

Certain embodiments disclosed herein include a method for waking up a low-power wireless device. The method comprises: initializing a wakeup sensitivity to minimum of a wakeup circuit of the wireless device; searching for at least one beacon by the wakeup circuit; increasing the wakeup sensitivity of the wakeup circuit when the at least one beacon is not found; and setting the wakeup sensitivity to a value at which the least one beacon is received.

Certain embodiments disclosed herein also include a wakeup circuit for detecting a wakeup signal and operable in low-power wireless device. The wakeup circuit comprises: a wakeup receiver configured to detect wakeup signals from RF signals received at an antenna of the wireless device; and an antenna tuner configured to tune a frequency of the antenna of the wireless device; and a controller configured to control the wakeup receiver to at least calibrate the sensitivity of the wakeup receiver and to tune the frequency of the antenna to allow fast detection of a wakeup signal

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a system and method for effectively waking up a wireless device without requiring a reference clock in a low-power wireless device. To this end, the disclosed embodiments utilize a wakeup circuit to perform the wakeup process while maximizing the probability of activating (or waking up) the device system by a specific target signal of interest. An example target signal of interest is the BLE Advertising event signals of beacons on channel 37 (2402 MHz), channel 38 (2426 MHz), and channel 39 (2480 MHz). More particularly, the disclosed embodiments exploit frequency allocation and temporal pattern of these signals to identify the signal energy envelope that match the expected energy envelope. The wakeup circuit is configured to detect both the rising and falling edge of the received signals. It should be noted that the wakeup process, disclosed herein, is optimized to monitor and search for the rising and falling edges of the received signals.

The disclosed embodiments improve sensitivity and selectivity in detecting target signals within the 2.4 GHz ISM radio frequency band. The sensitivity of the system may be optimized for the surrounding of the Internet of things (IoT) tag further to eliminate detection of non-beacon BLE signals, which in return enable effective management of the stored energy. Furthermore, it has been identified that a reference clock including a crystal oscillator are often implemented on wireless IoT tags to provide sufficiently accurate and stable time and/or frequency reference. However, the disclosed embodiments eliminate the crystal oscillator by utilizing the signals for the wakeup process. Such elimination of the crystal oscillator not only decrease the overall cost, but also the size that are highly desirable for wireless devices such as, for example, an IoT tag.

Figure 1:
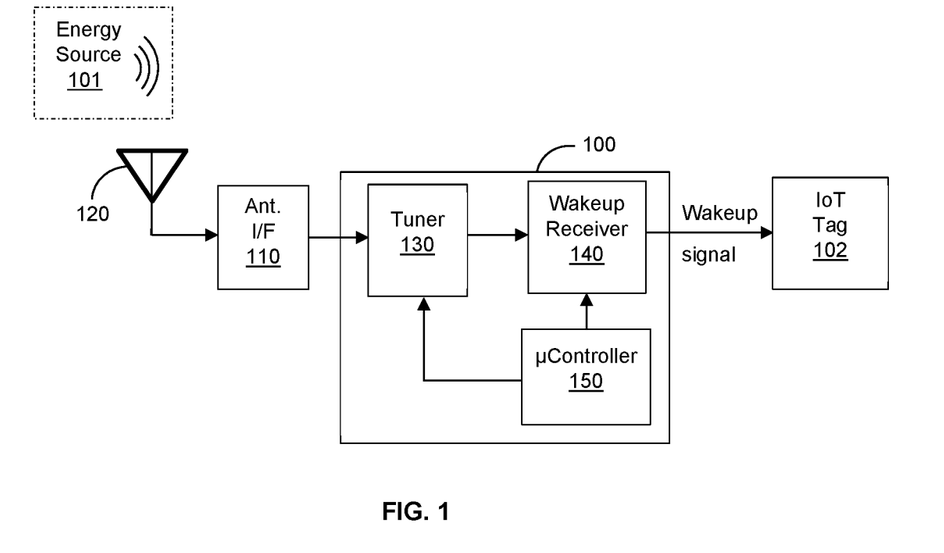
FIG. 1 is a block diagram of a wakeup circuit according to an embodiment.

FIG. 1 is an example block diagram of a wakeup circuit 100 according to an embodiment. The wakeup circuit 100 includes a tuner circuit 130, a wakeup receiver 140, and a microcontroller 150. The wakeup circuit 100 is coupled to an antenna interface 110 and an antenna 120. The antenna 120 is structured with a transmit/receive antenna for transmission and reception of signals from the energy source 101.

According to the disclosed embodiments, a wakeup circuit 100 is designed for a small, low power wireless IoT tag 102 with high sensitivity and selectivity. To this end, the wakeup receiver 140 is designed with low power computation and high sensitivity to allow fast and accurate detection of a wakeup signal. In a further embodiment, the IoT tag 102 uses over-the-air signals as a reference clock. That is, the IoT tag 102 does not include a crystal or any physical source providing a reference clock that may increase cost, size, and power consumption in a wireless IoT device. The over-the-air signals is used for calibration to allow transmission and reception of signals, such as BLE signals. An example technique for calibration and the IoT tag 102 from over-the-air signals is described in more detail in U.S. Pat. No. 10,886,929 to Yehezkely et al, assigned to the common assignee, the contents of which are hereby incorporated by reference. The IoT tag 102, in an embodiment, operates at the BLE communication protocol.

It should be appreciated that since a calibration operation follows the wakeup event, given the limited duration of the incident signal, a wakeup event (or signal) must be detected very fast, e.g., within tens of microseconds from the moment a RF signal is received. In an embodiment, a wakeup event is defined as a proper reception of at least one BLE advertising beacon on at least one BLE advertising channel. In an embodiment, in order to remove false detection, a wakeup event is triggered when consecutive BLE advertising beacons are received on at least two BLE advertising beacons.

A wakeup signal can be detected from an RF signal transmitted by an energy source 101. In an example embodiment, the energy source 101 may be electromagnetic energy available from existing wireless signals that exist in the environment. Such wireless signals may comply with known wireless standards, such as Wi-Fi (IEEE 802.11) which operates at the 2.4 GHz and 5-6 GHz bands, the BLE protocol which operates in the 2.400-2.4835 GHz band, Wi-Gig which operates at the 60 GHz band, cellular signals that comply with cellular standards (such as 2G, 3G, LTE, 4G, 5G, 5G mmWave, and the like), and Industrial, Scientific, and Medical (ISM) frequency band such as sub 1 Ghz, frequency modulation (FM) radio signals, and the like. In an embodiment, the antenna 120 may include plurality of antennas.

The tuner circuit 130 is configured with an antenna frequency controller to calibrate the local oscillator (LO, not shown), and thus a receive antenna of the antenna interface 110. Calibration of the LO frequency tunes the receive antenna frequency and enables effective detection of electromagnetic signals that match in frequency. In an embodiment, the antenna frequency controller may be a digital controller oscillator (DCO).

The wakeup receiver 140 is configured to detect a wakeup signal that activates the IoT tag 102. Here, the wakeup receiver 140 monitors the ambient energy signals from the surrounding and identifies the presence of the target signals of interest. In particular, sensitivity and selectivity of the wakeup mechanism is important to effectively activate and deactivate and thus, preserve energy in wireless IoT tags. An example for such target signals is mentioned below.

In an embodiment, the wakeup receiver 140 may share a common interface with the antenna interface 110. In this configuration, tuning of the wakeup receiver 140 for the target signals may be performed through a chain of events. In an embodiment, calibration of a receive antenna is first required to tune the antenna 120. Due to the shared common interface, tuning of the antenna 120 tunes the wakeup receiver 140 as well. Typically, calibration of the receive antenna requires a reference clock generate by a crystal within the wireless device, but the disclosed embodiments circumvent such configuration to reduce cost and size of the wireless device. More particularly, multiple target signals of the wakeup mechanism may be measured to take the ratio of the measured frequency and the known absolute frequency.

Once the absolute frequency is determined of a given signal, the wakeup receiver 140 may measure the frequency of the internal clock to determine the frequency of the signal. In an embodiment, the determined frequency may be used for system calibration procedures, such as calibrating the LO to tune the frequency of the antenna for transmission and reception and calibrating the symbol clock that is used for timing the symbol data in the transmitted data packets. In another embodiment, the internal clock frequency may be dynamically temperature compensated prior to use in receive antenna calibration.

In an embodiment, the target signals of interest may be one or more of the three beacons of the BLE Advertising Event in the 2.4 GHz ISM radio frequency band and denoted as Channel 37 (2402 MHz), Channel 38 (2426 MHz), and Channel 39 (2480 MHz). The BLE Advertising beacons include triplet of these beacons transmitted consecutively, where the durations of the beacons are typically between 120 µs and 376 µs, the gap time between the beacons are typically between 150 µs and 800 µs, and the BLE Advertising beacon is repeated every 30 ms to 150 ms. These signals are distinguishable from beacons from other sources that have independent timing patterns. To this end, such frequency allocation and temporal energy patterns may be utilized to identify signal energy envelopes of the BLE Advertising beacons for effective wake up of the IoT tag 102. In an embodiment, the wakeup circuit 100 may dynamically learn the energy duration and the gap time of the beacons in each BLE Advertising event to better identify the BLE Advertising beacon.

The method for dynamically learning the energy duration and gap time of the beacons of the BLE Advertising beacon is to set an upper limit of the beacon's energy duration and another upper limit of the gap duration. The wakeup receiver 140 then searches for a BLE Advertising beacon, being a beacon triplet, where beacons with durations longer than this upper limit or beacon triplets with gap times larger than this upper limit are ignored. Upon identifying a valid beacon triplet and detecting that the ratios of the frequencies of the beacons in the found beacon triplet match the frequency ratios of the beacons of a BLE Advertising beacon, the wakeup receiver 140 can then assume that the found triplet is a BLE Advertising beacon, measure the beacon duration and gap time and then utilize this knowledge to further filter following beacon triplets which do not match this found beacon duration and gap time.

In an embodiment, the wakeup receiver 140 includes at least one radio frequency to direct current (RF-DC) convertor configured to output a DC voltage level in response to a RF signal received at an antenna 120. Each RF-DC convertor is coupled to a switch that can reset or disconnect the convertor. The wakeup receiver 140 includes a detector configured to output a wakeup signal when the DC voltage level output by the RF-DC convertor is higher than a reference voltage signal. In an embodiment, the reference voltage can be tuned so as to determine an initial sensitivity for the wakeup receiver 140.

In an embodiment, to allow fast detection of wakeup signals and control the sensitivity of detection, the frequency of the antenna is calibrated, and the receiver sensitivity is optimized. These processes are performed under the control of the microcontroller 150. A microcontroller 150 offers the ability to control various devices with a reduced size unit compared to, for example, using a separate microprocessor. Microcontrollers generally include a processor, a memory, and input/output peripherals, and typically also include non-volatile memory (NVM) such as a flash memory.

Figure 2A:
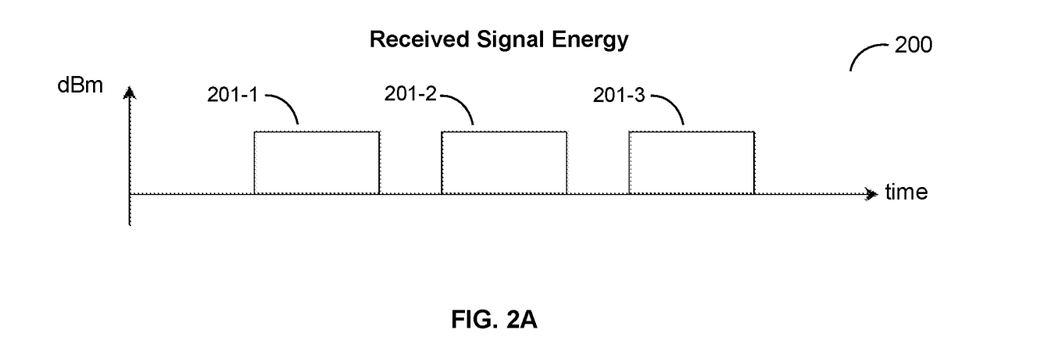
FIGS. 2A and 2B are graphs of a received signal energy and an integrated voltage over time according to an embodiment.
Figure 2B:
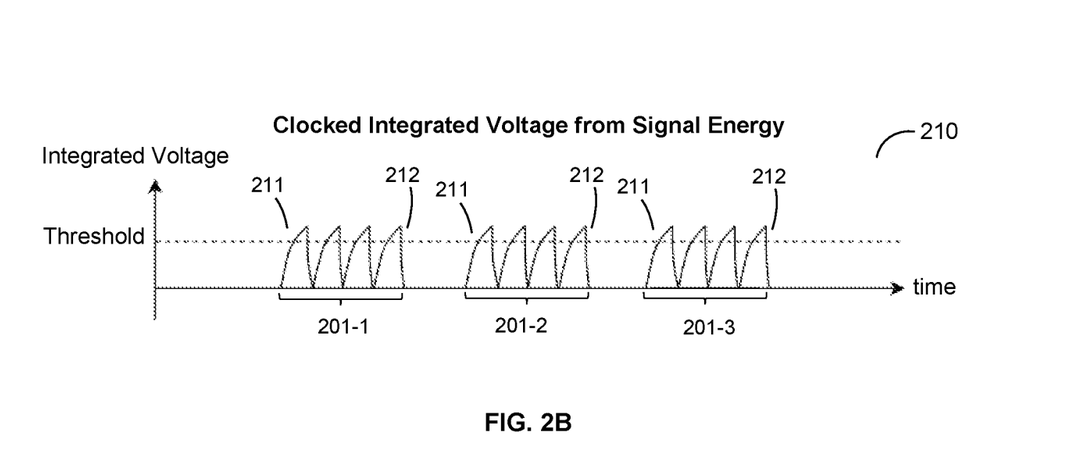

FIGS. 2A and 2B are example graphs of a received signal energy 200 and an integrated voltage 210 over time according to an embodiment. The received signal energy over time graph 200 shows energy envelopes of the BLE Advertising Event signals. Three separate energy envelopes 201-1 through 201-3 (hereinafter referred to individually as an energy envelope 201 and collectively as energy envelopes 201) indicate signals from channels 37, 38, and 39 of the BLE Advertising event beacons, respectively. The received signal energy, measured in decibel milliwatts (dBm), is a function of transmitted signal power from the energy source (101, FIG. 1), signal channel between the energy source and the receiver (e.g., antenna 120, FIG. 1), as well as the dissipation of energy between them. The graph 210 presents the integrated voltage of the received signal energy over time with a rising edge 211 and a falling edge 212 on each of the energy envelopes 201.

The wakeup circuit is a clocked mechanism which when activated, integrates and clears the received signal energy to detect these rising 211 and falling 212 edges of the received signal. In an embodiment, detecting both rising 211 and falling 212 edges of the envelope are required to monitor the energy envelopes 201 of the received signals. In an embodiment, a detection threshold may be predefined to modify the sensitivity and/or selectivity of the wakeup circuit and to determine presence of the target signal. In an example embodiment, a higher detection threshold may result a less sensitive wakeup mechanism, but in return may allow more selective wakeup mechanism in a given condition.

Figure 3:
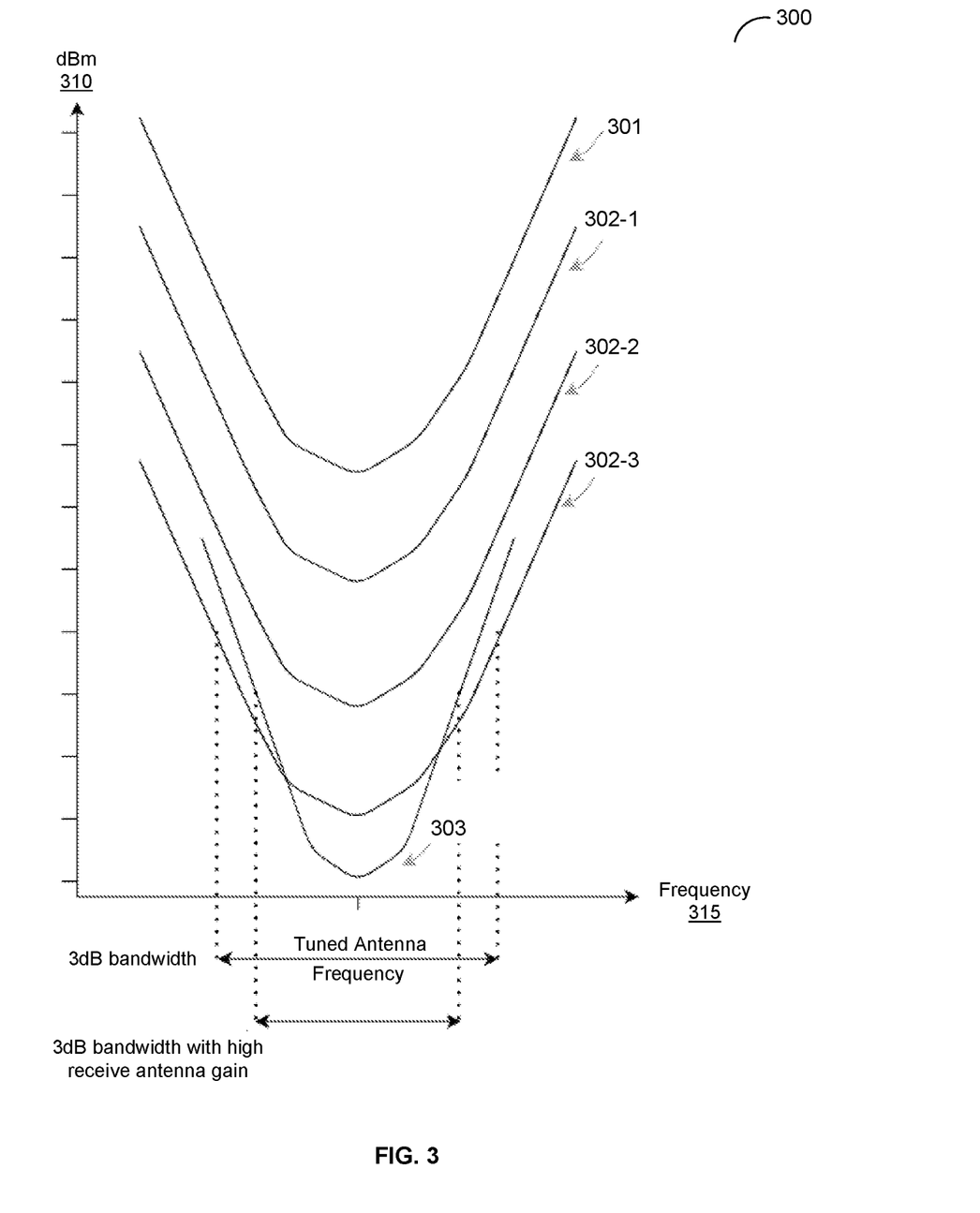
FIG. 3 is a graph illustrating a received signal energy over frequency at different sensitivity functions according to an embodiment.

FIG. 3 is an example graph 300 of a received signal energy 310 over a frequency 315 at different sensitivity functions according to an embodiment. The plots in the graph 300 display the received signal energy 310 at the same antenna frequency with change in sensitivity functions such as a signal attenuation 301, a signal integration 302, and a receive antenna gain 303. It should be noted that measurements of lower received signal energy 310 suggest higher sensitivity of the wakeup mechanism (i.e., plot 303 displays condition for highest sensitivity). Plot 301 shows measurements with high signal attenuation and short signal integration. In an example embodiment, a wakeup mechanism gain chain may be used to amplify the received energy signals, where more elements in the gain chain increase sensitivity.

Plot 302-1 through 302-3 show received signal energy 310 measurements with increasing signal integration from short to long, respectively, where greater sensitivity is achieved at long signal integration 302-3. Furthermore, plot 303 shows measurements at long signal integration and high receive antenna gain to result narrower 3 dB bandwidth than the plot without high receive antenna gain 302-3. As noted above, the wakeup circuit is coupled to the transmit/receive antenna (e.g., antenna 120, FIG. 1). In an embodiment, the gain of the receive antenna may be increased by performing antenna quality factor enhancement. And thus, more sensitive wakeup circuit and more selective antenna may be achieved through a higher receive antenna gain.

In an embodiment, the wakeup circuit sensitivity may be further modified by an antenna frequency setting, where sensitivity is optimally highest when the receive antenna (e.g., antenna 120, FIG. 1) is tuned to match the frequency of the target signal. A larger frequency mismatch may degrade target signal detection and thus, lower the sensitivity of the wakeup mechanism. Furthermore, the selectivity of the wakeup mechanism may also be increased with matching antenna frequency setting as the receive antenna will effectively detect signals that have matching frequency. For example, when detecting a beacon on channel 37, the receive antenna should be tuned to 2402 MHz for optimal sensitivity and selectivity of the wakeup circuit. It should be noted that the sensitivity of the wakeup circuit may be adjusted with the above-mentioned functions such as the detection threshold, the signal attenuation, the signal integration, the receive antenna gain, and the antenna frequency setting.

In an embodiment, highly sensitive wakeup circuit can allow detection of weaker signals, but has a tradeoff in that the density of detectable signals increase as well causing detection of undesirable, non-target signals. In such case, the sensitivity may be limited to decrease the probability of unnecessary false signal detections. In an example embodiment, in presence of two BLE Advertising Event beacon sources, the sensitivity may be limited to only detect the stronger of the two beacon sources to reduce such false detection. It should be noted that both sensitivity and the selectivity of the wakeup circuit determines the effectivity of the circuit and the wakeup point of the wireless device. In this regard, once the wakeup sensitivity is calibrated, the wakeup circuit may be configured for higher selectivity by increasing the receive antenna gain, together with either reduction of the signal integration or increase of the detection threshold, for example, to maintain the sensitivity and to filter out undesired signals.

Figure 4:
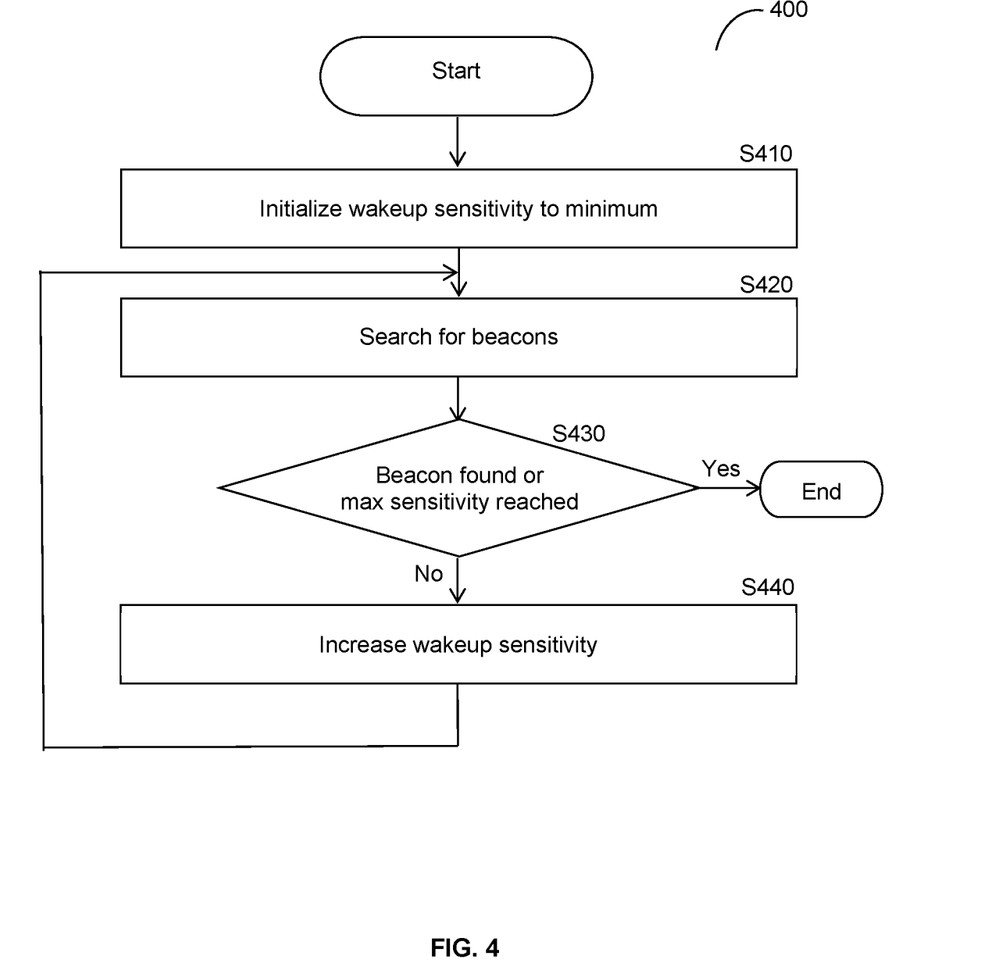
FIG. 4 is a flowchart illustrating a method for calibrating a wakeup sensitivity according to an embodiment.

FIG. 4 is an example flowchart 400 illustrating a method for calibrating a wakeup sensitivity according to an embodiment. In an embodiment, the method is carried out at the wakeup circuit 100, FIG. 1, under the control of the microcontroller 150.

At S410, the wakeup sensitivity is initialized to minimum assuming a strong beacon signal. In a scenario with the strong beacon, a high wakeup sensitivity may result incomplete clearance of the received signal energy during the integration and clearing process. Thus, the rising and falling edges of the received signals may not be identified as required by the wakeup mechanism. To this aim, the wakeup sensitivity may be set to minimum.

At S420, the event beacons are searched by the wakeup circuit. The event beacons may include BLE Advertising event beacons. In an embodiment, a timeout timer may be utilized for the beacon search where several occurrences of timeout indicate that the wakeup mechanism lacks sensitivity. In an embodiment, a time period for the timeout timer may be predetermined.

At S430, it is checked if a beacon of the event is found or if max sensitivity is reached. If yes, the wakeup circuit sensitivity is well calibrated or the wakeup circuit has reached its maximum sensitivity and thus the operation ends. Otherwise, execution continues to S440.

At S440, the wakeup sensitivity is increased, and the execution continues to S420 to search for event beacons at higher wakeup sensitivity. Such sensitivity increase may be performed by adjusting above-mentioned sensitivity functions such as, but not limited to, detection threshold, signal attenuation, signal integration, receive antenna gain, and antenna frequency setting. In an embodiment, the wakeup sensitivity may be periodically reinitialized and recalibrated for optimal performance of the wakeup mechanism.

Figure 5:
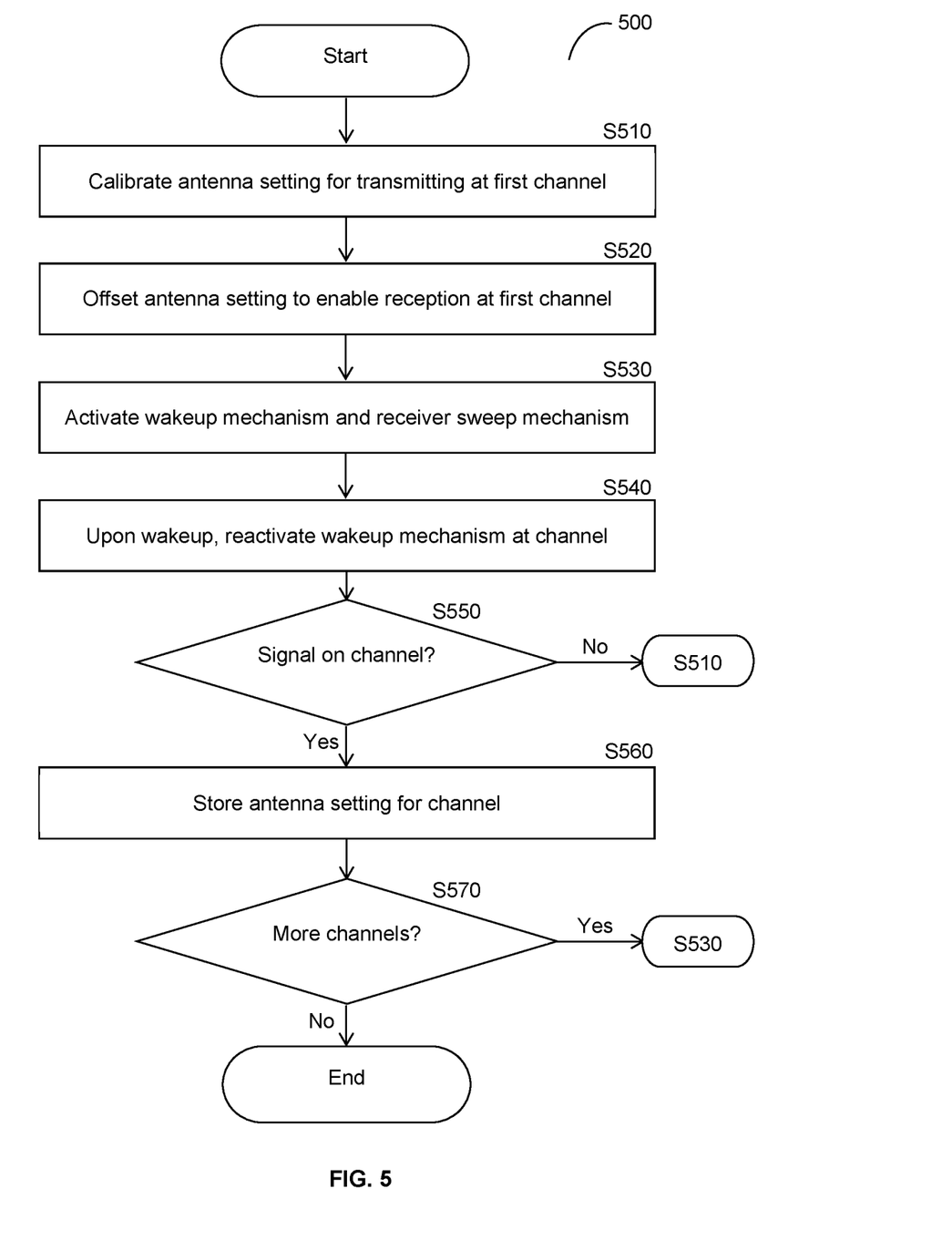
FIG. 5 is a flowchart illustrating a method for optimizing antenna frequency setting by a receive antenna frequency sweeping according to an embodiment.

FIG. 5 is an example flowchart 500 illustrating a method for optimizing antenna frequency setting by a receive antenna frequency sweeping according to an embodiment. In an embodiment, the method is carried out at the wakeup circuit 100, FIG. 1, under the control of the microcontroller 150.

At S510, the antenna setting is set for transmitting at a first channel. In an embodiment, the first channel is a channel number 37 of the BLE Advertising event.

At S520, the antenna setting is offset from the calibrated transmitting setting to enable reception of the first channel. Such offset accommodates for the small deviation of the reception frequency setting from the transmitting frequency setting. Initially, the offset of the antenna setting to enable reception at the first channel is a coarse estimation of the actual offset setting, hence a receiver antenna sweep mechanism is used to find this actual offset.

At S530, the wakeup circuit and the receiver sweep mechanism are activated. The receiver sweep mechanism enables the antenna tuner to sweep the antenna setting value from lower to higher antenna frequency, repeatedly, centered at the offset reception setting of S520. Here, the antenna setting that wakes up the system is identified as the required antenna setting value for the target channel and its frequency.

At S540, upon wakeup, the wakeup circuit is reactivated by the identified antenna setting value at the target channel.

At S550, it is checked if the received beacon (signal) is on the target channel. If so, the execution continues to S560. If not, the execution returns to S510, where the antenna setting may be calibrated for a reception at a different channel.

At S560, the identified antenna setting value for the target channel is stored. In an embodiment, the antenna setting value may be stored in an external memory or within an on-tag memory (not shown), e.g., a non-volatile memory (NVM), for future reference.

At S570, it is checked if more channels are present. If no, the execution terminates. If yes, the execution returns to S530. Upon returning to S530, the antenna setting is kept at the previous antenna setting until the end of the previous signal. Then, the receiver sweep mechanism is activated for the next channel.

In an embodiment, the method of FIG. 5 may include iterations for three channels.

In example embodiment, the more channels may include channels 38 and 39 of the BLE Advertising event. It should be appreciated that identifying and setting the antenna frequency to each of the target channels will maximize the reception sensitivity and allow receive antenna hopping between the beacons of the BLE Advertising event.

It should be noted that careful calibration and optimization of the wakeup circuit increases the probability of detecting the target signals to efficiently wake up the system only at the target signals, which in return allow effective management and conservation of stored power in wireless IoT tags.

Figure 6:
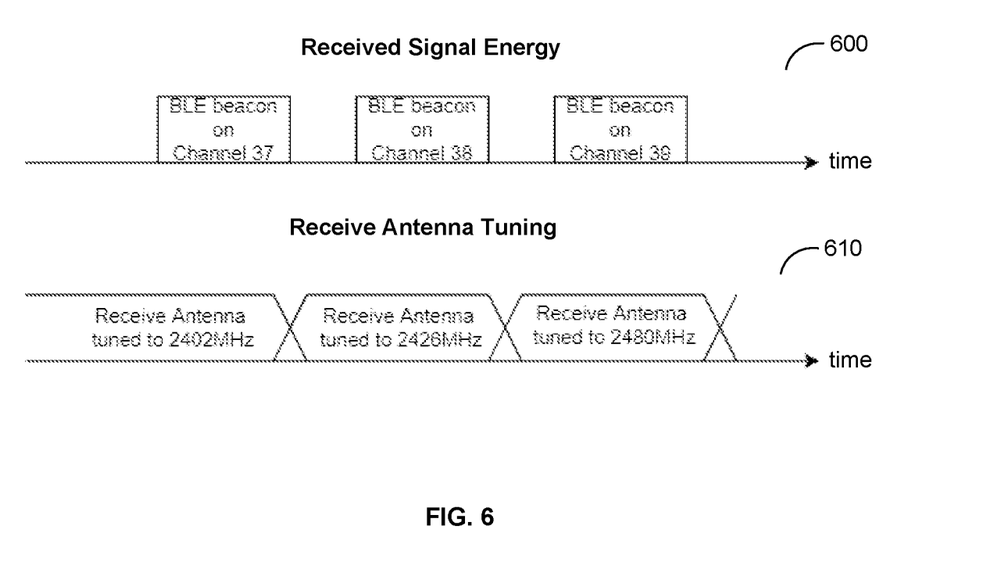
FIG. 6 is a schematic graph of a received signal energy and a corresponding receive antenna tuning over time according to an embodiment.

FIG. 6 is an example schematic graph of a received signal energy 600 and a corresponding receive antenna tuning 610 over time according to an embodiment. The example received signal energy graph 600 shows energy envelopes from the three BLE beacons on channels 37, 38, and 39. In order to effectively detect such signals, a receive antenna tuning for each of the BLE Advertising event beacons is desired. To this aim, the wakeup mechanism may perform hopping of the receive antenna tuning as shown in the example receive antenna tuning graph 610.

The receive antenna tuning is initially tuned to 2402 MHz to detect signals on channel 37. Upon detecting the falling edge of the beacon, the receive antenna tuning is changed to 2426 MHz for detecting the beacon of channel 38. Likewise, the falling edge of the signal from beacon on channel 38 changes the receive antenna tuning to 2480 MHz for detecting the beacon of channel 39. Such receive antenna frequency hopping may be utilized for effectively detecting target signals from the densely populated electromagnetic ambient energy. It should be noted that effective detection of target signals increases sensitivity and selectivity of the wakeup circuit to improve its performance.

Figure 7:
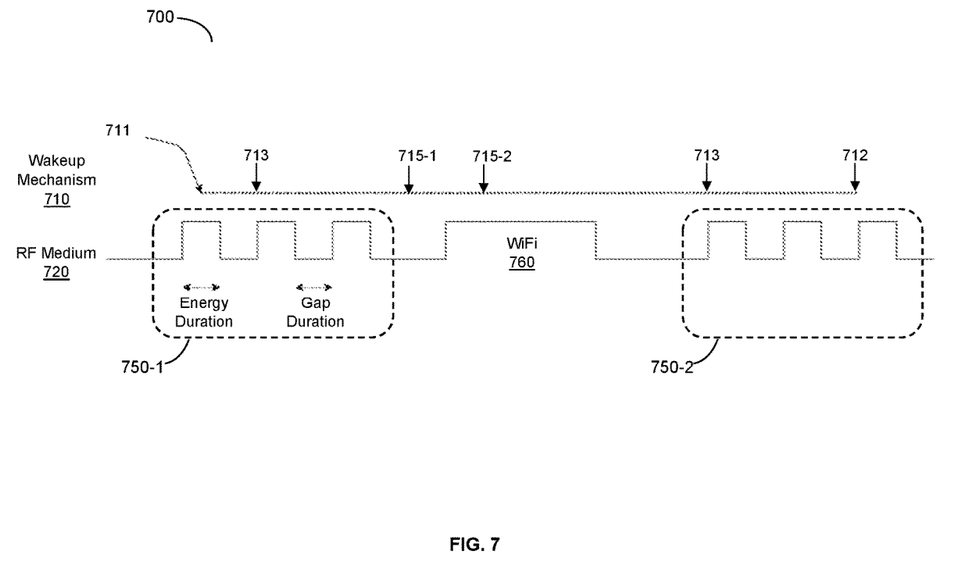
FIG. 7 is an example signal diagram illustrating a process of a wakeup according to one embodiment.

FIG. 7 is an example signal diagram 700 illustrating a process of a wakeup according to one embodiment. A wakeup mechanism plot 710 shows an active searching period of the wakeup mechanism from a search starting point 711 to a system wakeup point 712, which is when the searching ends. An RF medium plot 720 shows radio frequency signals at the 2.4 GHz ISM band in the surrounding. In the example plot 720, a first BLE Advertising event 750-1 is followed by a WiFi 760, then by a second BLE Advertising event 750-2.

Each of the BLE Advertising events occur in triplets including signals from beacons of channels 37, 38, and 39, consecutively. In particular, these three energy envelopes have nominally same energy durations and gap durations between them. In this regard, the wakeup mechanism may utilize such characteristics of the BLE Advertising event to identify and then trigger wake up of the system. When the detected energy envelope does not match the expected energy envelope, the wakeup mechanism may reset and continue the search until the expected energy envelope is detected.

In an example embodiment, the wakeup circuit is configured to wake up the wireless IoT tag upon detection of the BLE beacon on channel 39, more specifically at detection of the third rising edge (e.g., 712) of the BLE Advertising events. As shown in the wakeup mechanism plot 710, the search staring point 711 is after the rising edge of first energy envelope (channel 37) of the first BLE Advertising event 750-1 and thus, the second energy envelope (channel 38) is labeled as a first rising edge 713. The wakeup circuit is configured to monitor the rising and falling edges of each of the envelopes, as well as their energy duration and gap duration in search for the third rising edge. A violation to the gap duration 715-1 is determined based on absence of the expected third rising edge at the first BLE Advertising event 750-1; and the search is reset.

Furthermore, a violation of the energy duration 715-2 is determined to reset the search. The violation of the energy duration 715-2 occurs due to the absence of the expected falling edge as in the BLE energy envelope, thus allowing bypass of the non-target signal, WiFi 760 in this example. Following the reset at the violation 715-2, the wakeup mechanism continues its search for the first rising edge 713 and the third rising edge 712, while monitoring the energy duration and the gap duration. At the detection of the third rising edge 712, the wakeup mechanism may stop the search and wake up the system for processing of signals.

It should be noted that the example embodiment demonstrates the process of the wakeup mechanism at one example target signal. However, the wakeup circuit may be configured to detect other target signals such as, but not limited to other BLE Advertising event signals, such as beacon from channel 37 and channel 38.

In yet another embodiment, the wakeup circuit may be configured to detect silent periods in the ISM 2.4 GHz band and to wake up the system when no energy is detected. The wakeup circuit may monitor the rising and falling edge of the energy envelopes, but in search for a prolonged silent period that follows such signals. In an embodiment, a valid silent period may be predefined in order to wake up the system only when the predefined silent period time has passed after the falling edge of the energy envelope. In an embodiment, the silent period may be utilized for, but not limited to, calibration and carrier collision assessment prior to transmission of BLE packets.

It should be noted that the computer-readable instructions may be construed broadly to mean any type of instructions, whether referred to as software, firmware, middleware, microcode, hardware description language, or otherwise. Instructions may include code, such as in source code format, binary code format, executable code format, or any other suitable format of code. The instructions, when executed by the circuitry, cause the circuitry to perform the various processes described herein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units (CPUs), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A wakeup circuit for detecting a wakeup signal and operable in a low-power wireless device, comprising:
   a wakeup receiver configured to detect wakeup signals from radio frequency (RF) signals received at an antenna of the wireless device;
   an antenna tuner configured to tune a frequency of the antenna of the wireless device; and
   a controller configured to control the wakeup receiver to calibrate a sensitivity of the wakeup receiver by:
   initializing a wakeup sensitivity to a minimum wakeup sensitivity level of the wakeup receiver of;
   searching, by the wakeup circuit, for at least one known RF signal pattern;
   increasing the wakeup sensitivity level of the wakeup circuit when the at least one known RF signal pattern is not found; and
   setting the wakeup sensitivity to a wakeup sensitivity level at which the least one known RF signal pattern is received, wherein the controller is further configured to and to tune the frequency of the antenna to allow fast detection of a wakeup signal.

2. The wakeup circuit of claim 1, wherein the wakeup circuit is coupled to an antenna interface of the wireless device.

3. The wakeup circuit of claim 1, wherein the controller is further configured to:
   calibrate an antenna setting of the wireless device to transmit signals over a first channel;
   offset the calibrated antenna setting to allow reception of the at least one known RF signal pattern of the first channel;
   sweep the antenna setting value from a low frequency to a high frequency repeatedly;
   upon the reception of the at least one known RF signal pattern, check if the received known RF signal pattern is on the first channel; and
   store the antenna setting for the first channel.

4. The wakeup circuit of claim 1, wherein the controller is further configured to:
   calibrate an antenna setting to transmit signals over any one of a second channel and a third channel, when the at least one known RF signal pattern is not received;
   check if a received beacon is on any one of the second channel and the third channel, upon a reception of the at least one known RF signal pattern; and
   storing the antenna setting for on which the at least one known RF signal pattern is received.

5. The wakeup circuit of claim 4, wherein a first channel and the second channel are Bluetooth Low Energy (BLE) advertising channels, and wherein the known RF signal pattern is a BLE beacon.

6. The wakeup circuit of claim 5, wherein the controller is further configured to:
   set the antenna setting of at least one beacon on an edge of a received beacon channel.

7. The wakeup circuit of claim 3, wherein sweeping the antenna setting causes tuning of the wakeup circuit.

8. The wakeup circuit of claim 3, wherein the low-power wireless device is at least an IoT tag operable at a BLE communication protocol.

9. The wakeup circuit of claim 8, wherein the wakeup signal is an output upon detection of a BLE adverting beacon on a BLE Advertising channel.

10. The wakeup circuit of claim 9, wherein the wakeup signal is an output upon detection of at least two consecutive BLE adverting beacons on at least two consecutive BLE Advertising channels.

* * * * *